US012248778B2

(12) United States Patent
Ogawa

(10) Patent No.: US 12,248,778 B2
(45) Date of Patent: Mar. 11, 2025

(54) COMMUNICATION DEVICE AND CONTROL METHOD

(71) Applicant: Canon Kabushiki Kaisha, Tokyo (JP)

(72) Inventor: Masayuki Ogawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 453 days.

(21) Appl. No.: 17/671,941

(22) Filed: Feb. 15, 2022

(65) Prior Publication Data
US 2022/0261236 A1   Aug. 18, 2022

(30) Foreign Application Priority Data

Feb. 17, 2021 (JP) .................................. 2021-023692

(51) Int. Cl.
G06F 9/44       (2018.01)
G06F 8/656      (2018.01)
H04L 67/00      (2022.01)

(52) U.S. Cl.
CPC .............. G06F 8/656 (2018.02); H04L 67/34 (2013.01)

(58) Field of Classification Search
CPC ...................................................... G06F 8/656
USPC ......................................................... 717/168
See application file for complete search history.

(56) References Cited

U.S. PATENT DOCUMENTS

| | | | | |
|---|---|---|---|---|
| 7,020,543 | B1 * | 3/2006 | Jaeschke | F23N 5/00 700/275 |
| 7,859,693 | B2 * | 12/2010 | Ueno | G06K 15/00 358/1.14 |
| 10,514,902 | B2 * | 12/2019 | Chakkaravarthi | G06K 7/1413 |
| 2003/0191973 | A1 * | 10/2003 | Johnson | G06F 1/3228 713/300 |
| 2006/0070055 | A1 * | 3/2006 | Hodder | G06F 8/65 717/168 |
| 2012/0079473 | A1 * | 3/2012 | Watanabe | G06F 8/65 717/170 |
| 2015/0178061 | A1 * | 6/2015 | Wang | G06F 8/61 717/172 |

(Continued)

FOREIGN PATENT DOCUMENTS

| | | | | |
|---|---|---|---|---|
| EP | 1760583 A1 * | 3/2007 | | G06F 8/65 |
| JP | 2007069368 A | 3/2007 | | |
| JP | 2010041375 A | 2/2010 | | |

(Continued)

OTHER PUBLICATIONS

Japanese Office Action issued Nov. 5, 2024 in counterpart Japanese Patent Appln. No. 2021-023692.

*Primary Examiner* — Evral E Bodden
(74) *Attorney, Agent, or Firm* — Venable LLP

(57) ABSTRACT

A communication device, in a case where the power supply operation by a user has been detected, displays, on a display unit, an update screen capable of receiving a user instruction for updating software on a basis that the communication device is in a state in which the software can be updated before changing the power supply state of the communication device in accordance with the power supply operation. The communication device, even in a state in which a user instruction has not been received with respect to the update screen, displays the update screen until a predetermined time has elapsed, and changes the power supply state of the communication device in accordance with the power supply operation after the predetermined time has elapsed.

15 Claims, 16 Drawing Sheets

(56) References Cited

U.S. PATENT DOCUMENTS

2015/0363188 A1* 12/2015 Tsuchiya ................... G06F 8/65
717/173

FOREIGN PATENT DOCUMENTS

| JP | 2012232465 A | 11/2012 |
| JP | 2013123880 A | 6/2013 |

* cited by examiner

FIG. 5

```
<?xml version="1.0" encoding="UTF-8" ?>
<update_data_info>
 <ROMVersion>ROM VERSION</ROMVersion>         —501
 <ROMSize>ROM DATA SIZE</ROMSize>             —502
 <ModelName>MODEL NAME</ModelName>            —503
</update_data_info>
```

LATEST FIRMWARE IS AVAILABLE FOR PRINTER IN USE.
EXECUTE FIRMWARE UPDATE FOR PRINTER?

| NO | YES |

FIG. 11

FIRMWARE HAS BEEN SUCCESSFULLY UPDATED.
PLEASE PRESS "OK"

FIG. 12

FIRMWARE HAS NOT BEEN SUCCESSFULLY UPDATED.
PLEASE PRESS "OK"

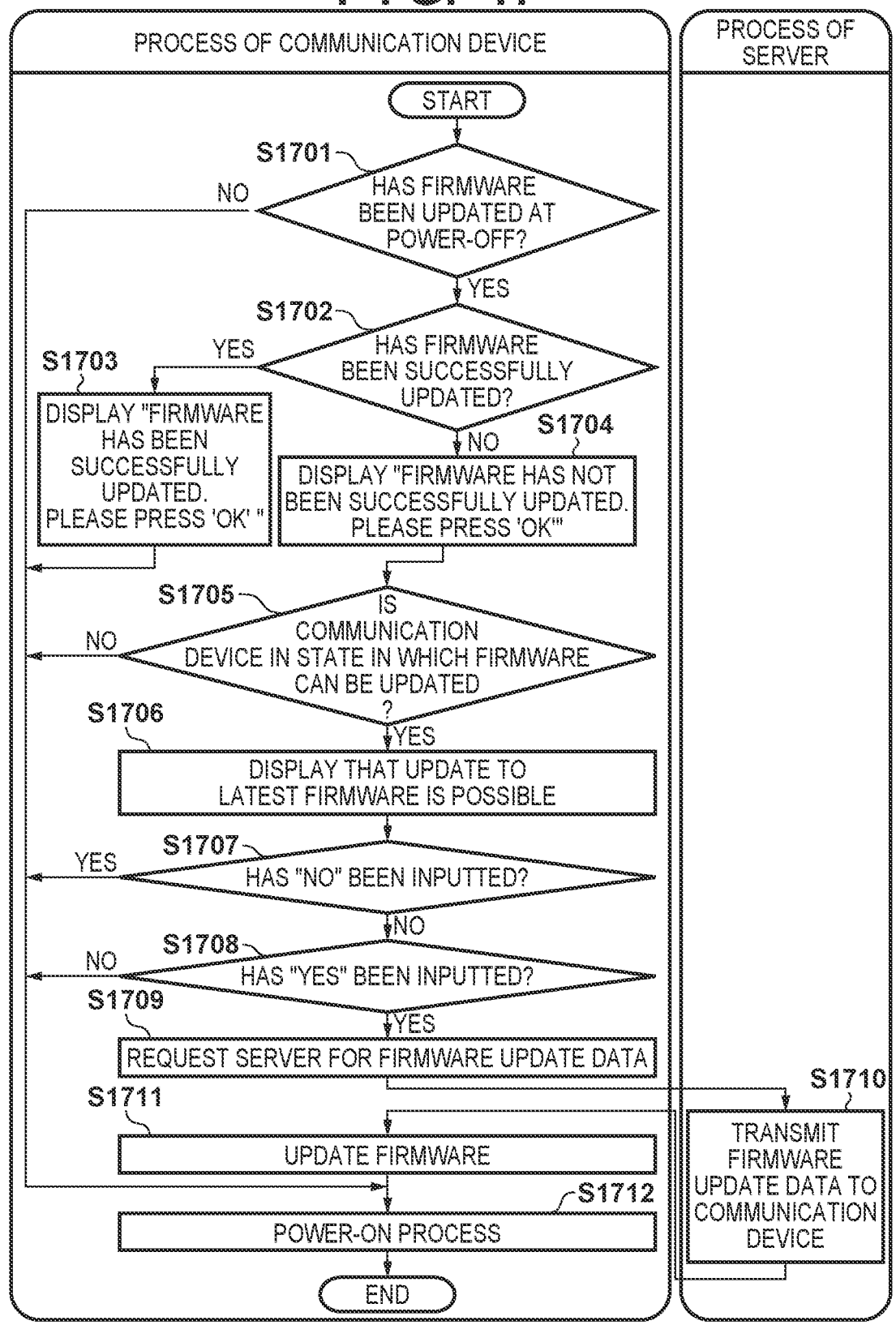

COMMUNICATION DEVICE AND CONTROL METHOD

BACKGROUND

Field

The present disclosure relates to a communication device and a control method for controlling software updates.

Description of the Related Art

A printer that can communicate with a server over a network may retrieve printer update data from the server and notify a user that the latest firmware is available. In such a case, when the user operates the printer, the firmware of the punter is updated to the latest one. As a method of notifying the user that there is the latest firmware at an appropriate timing, Japanese Patent Laid-Open No. 2007-69368 describes displaying that firmware can be updated when the user performs a power-off operation for turning off the power of the printer.

SUMMARY

The present disclosure provides a technique that makes it easier for the user to recognize opportunities for updating software, such as firmware.

The present disclosure in one aspect provides, a communication device comprising: a detection unit configured to detect a power supply operation of the communication device by a user; a power supply control unit configured to charge a power supply state of the communication device in accordance with the power supply operation that the detection unit has detected; and a display control unit configured to, in a case where the detection unit has detected the power supply operation, display, on a display unit, an update screen capable of receiving a user instruction for updating software on a basis that the communication device is in a state in which the software can be updated, before the power supply control unit changes the power supply state of the communication device in accordance with the power supply operation, wherein the display control unit, even in a state in which a user instruction has not been received with respect to the update screen, displays the update screen until a predetermined time has elapsed, and the power supply control unit changes the power supply state of the communication device in accordance with the power supply operation after the predetermined time has elapsed.

According to the present disclosure, it is possible to make it easier for the user to recognize opportunities for updating software.

Further features of the present invention will become apparent from the following description of exemplary embodiments with reference to the attached drawings.

BRIEF DESCRIPTION OF THE DRAWINGS

FIG. 5 is a diagram illustrating the firmware update information.

FIG. 7 is a diagram illustrating a user interface screen.

FIG. 11 is a diagram illustrating a user interface screen.

FIG. 12 is a diagram illustrating a user interface screen,

FIG. 17 is a flowchart illustrating a process for when a power-on operation is detected.

DESCRIPTION OF THE EMBODIMENTS

Figure 1:
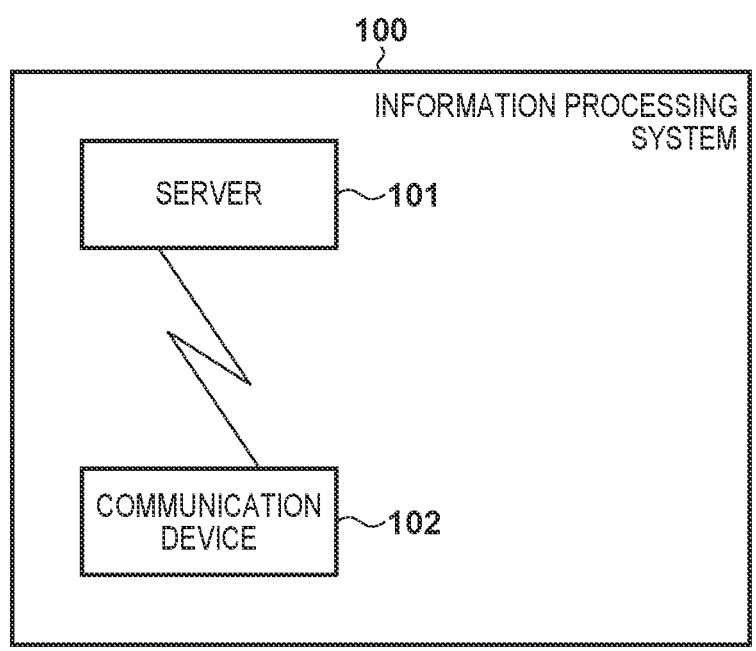
FIG. 1 is a diagram illustrating a configuration of an information processing system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Even if it is displayed that firmware can be updated when a power-off operation of a device is detected, there are cases where the user unintentionally fails to recognize the display and leaves it unattended. In such cases, no firmware update is performed and no power-off is performed.

According to the following embodiments, it is possible to make it easier for the user to recognize opportunities for updating software.

First Embodiment

FIG. 1 is a diagram illustrating an example of a configuration of an information processing system 100 in the present embodiment. The information processing system 100 includes a server 101 and a communication device 102. Although a printer is described in the present embodiment as an example of the communication device 102, limitation is not made to this, and various devices can be adopted so long as they are capable of communicating with the server 101. For example, if the communication device 102 is a printer, an ink jet printer, a full color laser beam printer, a monochrome printer, or the like can be adopted. In addition, not only printers but also copiers and facsimile machines, portable terminals, smartphones, notebook PCs (Personal Computers), tablet terminals, PDAs (Personal Digital Assistants), digital cameras, music playback devices, televisions, and the like can be adopted. In addition, MFPs (Multi Function Printers) having a plurality of functions such as a copying function, a fax function, and a printing function can also be adopted. A connection between the server 101 and the communication device 102 is possible via a communication network. Incidentally, the communication network may be any of a network by wireless communication, a network by wired communication, and a network including both.

Figure 2:
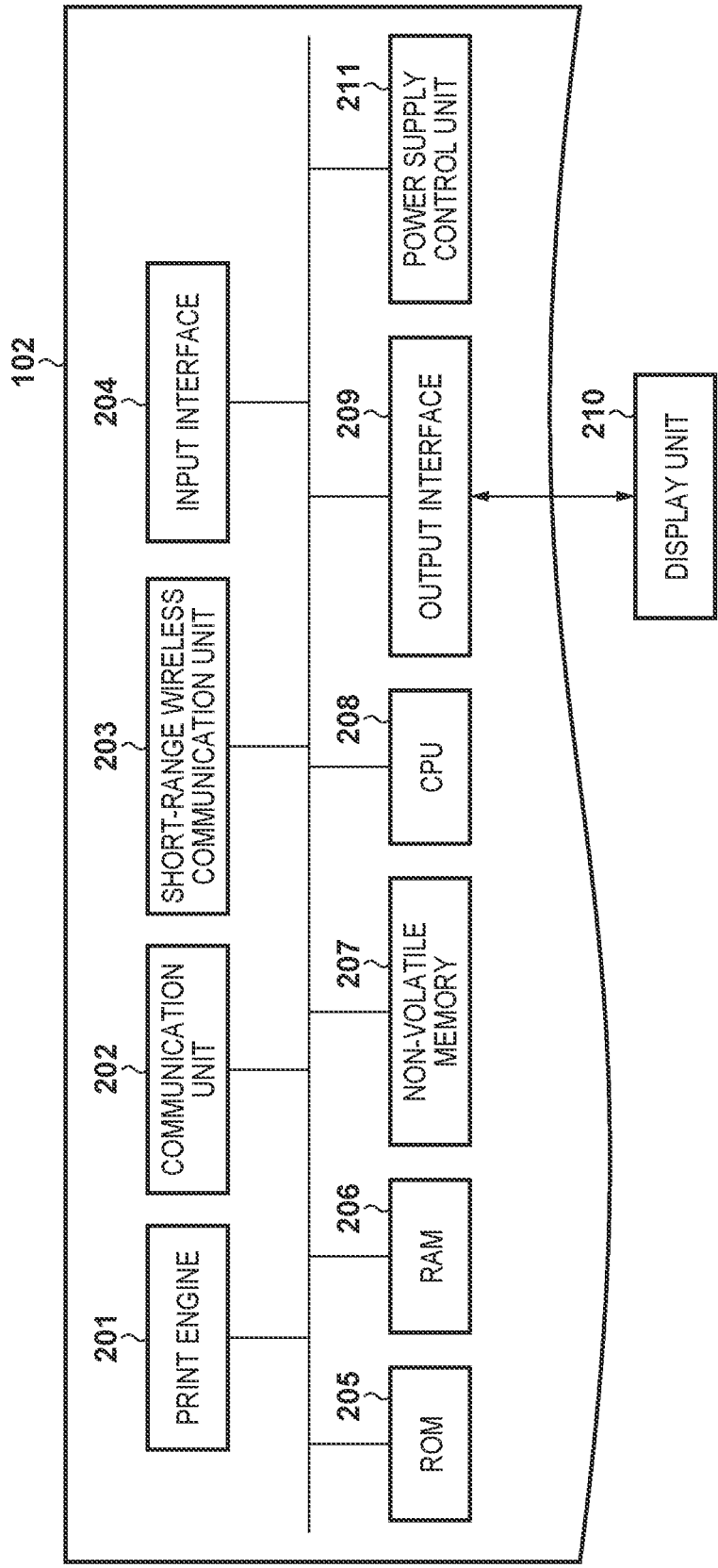
FIG. 2 is a block diagram illustrating a configuration of a communication device.

FIG. 2 is a block diagram illustrating an example of a configuration of the communication device 102. The communication device 102 includes a print engine 201, a communication unit 202, a short-range wireless communication unit 203, an input interface 204, a ROM (Read Only Memory) 205, a RAM (Random Access Memory) 206, a non-volatile memory 207, a CPU (Central Processing Unit) 208, an output interface 209, and a display unit 210. The communication unit 202, by connecting to a communication network, connects to an Internet provider and communicates data and the like with the server 101. A protocol such as HTTP (Hypertext Transfer Protocol) or XMPP (extensible Messaging and Presence Protocol), for example, is used for connecting to the communication network. The RAM 206 consists of a DRAM (Dynamic Random Access Memory) or the like that requires a backup power supply. Incidentally, since the RAM 206 holds data by being supplied with power for data backup (not illustrated), it can store data such as program control variables without volatilizing it. The RAM 206 is also used as the main memory and work memory of the CPU 208. For example, the RAM 206 functions as a receive buffer for temporarily storing firmware update information 500 received from the server 101. The firmware update information 500 will be described later in FIG. 5. The ROM 205 stores fixed data such as control programs executed by the CPU 208, a data table, and an OS (Operating System) program. In the present embodiment, each control program stored in the ROM 205 performs software execution control such as scheduling, task switching, and interrupt processing under the control of the embedded OS stored in the ROM 205. Further, the ROM 205 is provided with a memory area for storing data such as the management data of the communication device 102 that needs to be held even when power is not supplied. The CPU 208 is a system control unit and collectively controls the entire communication device 102.

The print engine 201 forms an image on a printing medium, such as paper, using a printing agent, such as ink, based on information stored in the RAM 206 or a print job received via the communication unit 202 and outputs a print result. The input interface 204 is an interface for receiving data input and operation instructions from the user, and includes, for example, a physical keyboard, buttons, a touch panel, and the like. The output interface 209 and the input interface 204, which will be described later, have the same configuration, and an output of a screen and the reception of operations from the user may be performed with the same configuration. The output interface 209 is a display control interface for the display unit 210 to display data or the state of the communication device 102. The display unit 210 is, for example, configured by an LED (light emitting diode), an LCD (liquid crystal display), or the like and displays data and the state of the communication device 102. Incidentally, a soft keyboard with keys such as numeric input keys, mode setting keys, an OK key, a cancel key, and a power key may be configured on the display unit 210 to accept inputs from the user via the display unit 210.

The non-volatile memory 207 is configured by a device such as an EEPROM (Electrically Erasable Programmable Read-Only Memory) or a flash memory, for example. The non-volatile memory 207 stores data such as setting values of the communication device 102, which need to be held even when the power of the communication device 102 is not supplied, for example.

A power supply control unit 211 controls the power supply state inside the communication device 102. For example, when it is notified from the CPU 208 that it has received an operation in relation to a power button (hereinafter, also referred to as a power supply operation) such as power-on and power-off from the user, the power supply control unit 211 performs control to change a power supply state of the communication device 102 in accordance with the power supply operation. Specifically, the power supply control unit 211 performs control to change from a normal startup state to a soft-off state or from the soft-off state to the normal startup state based on the power supply operation by the user. However, the power supply state of the communication device 102 is not limited thereto, and a sleep state in which the power consumption is smaller than the normal startup state and larger than the soft-off state may be present. In other words, the power supply control unit 211 can change to a state in which the power consumption is different. Further, the communication device 102, when a power cord is pulled from a power plug and is disconnected from a commercial power supply, enters a hard-off state (a state in which power is not supplied to each component of the communication device 102). The communication device 102 is not limited to the block configuration illustrated in FIG. 2, and may include other blocks as appropriate. For example, the communication device 102 may be configured with a memory such as an external HDD (Hard Disk Drive) or an SD (Secure Digital) card as an optional device, and the information stored in the communication device 102 may be stored in the memory.

Figure 3:
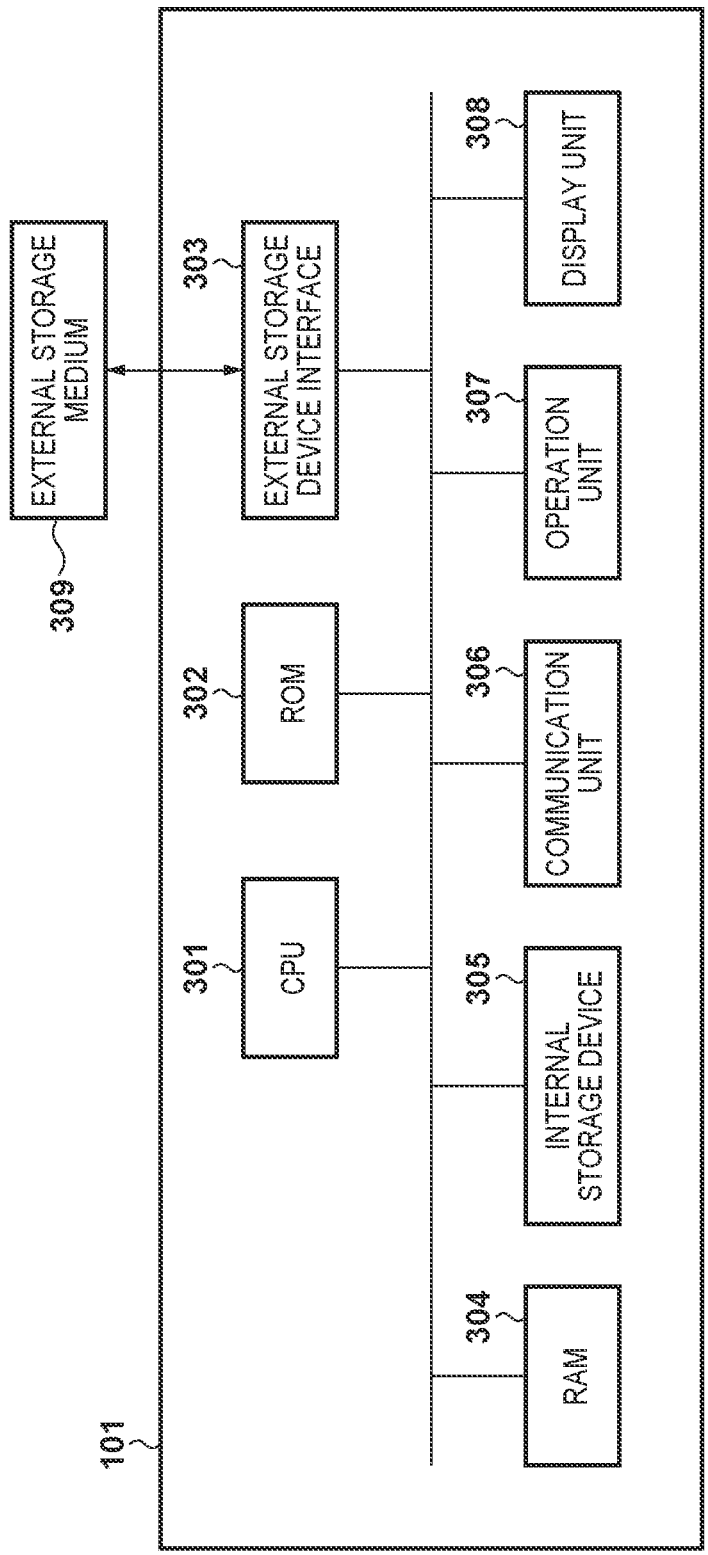
FIG. 3 is a block diagram illustrating a configuration of a server.

FIG. 3 is a block diagram illustrating an example of a configuration of the server 101, The server 101 includes a CPU 301, a ROM 302, an external storage device interface 303, a RAM 304, an internal storage device 305, a communication unit 306, an operation unit 307, and a display unit 308. The CPU 301 comprehensively controls the operation of the entire server 101 via a system bus in accordance with a program read from the ROM 302, the RAM 304, the internal storage device 305, the external storage device interface 303, or an external storage medium 309. The ROM 302 stores a control program and the like of the CPU 301, The RAM 304 temporarily stores programs and image data. The RAM 304 is also used as the main memory and work memory of the CPU 301. The internal storage device 305 stores an operating system, various application programs, image data, and the like. For example, pieces of application software and the like for transmitting and receiving various control instructions and data to and from the communication device 102 are installed in the internal storage device 305. These pieces of application software are acquired via the external storage medium 309 (e.g., CD/DVD media) from other computer-readable media on which they are stored and are installed under the control of the external storage device interface 303. The operation unit 307 controls a keyboard and a mouse (not illustrated) used by the user to input instructions. The display unit 308 performs various displays to the user. The communication unit 306, by connecting to a communication network, connects to an Internet provider and performs communication with the communication device 102. A protocol such as HTTP or XMPP is used for connecting to the communication network.

Figure 4:
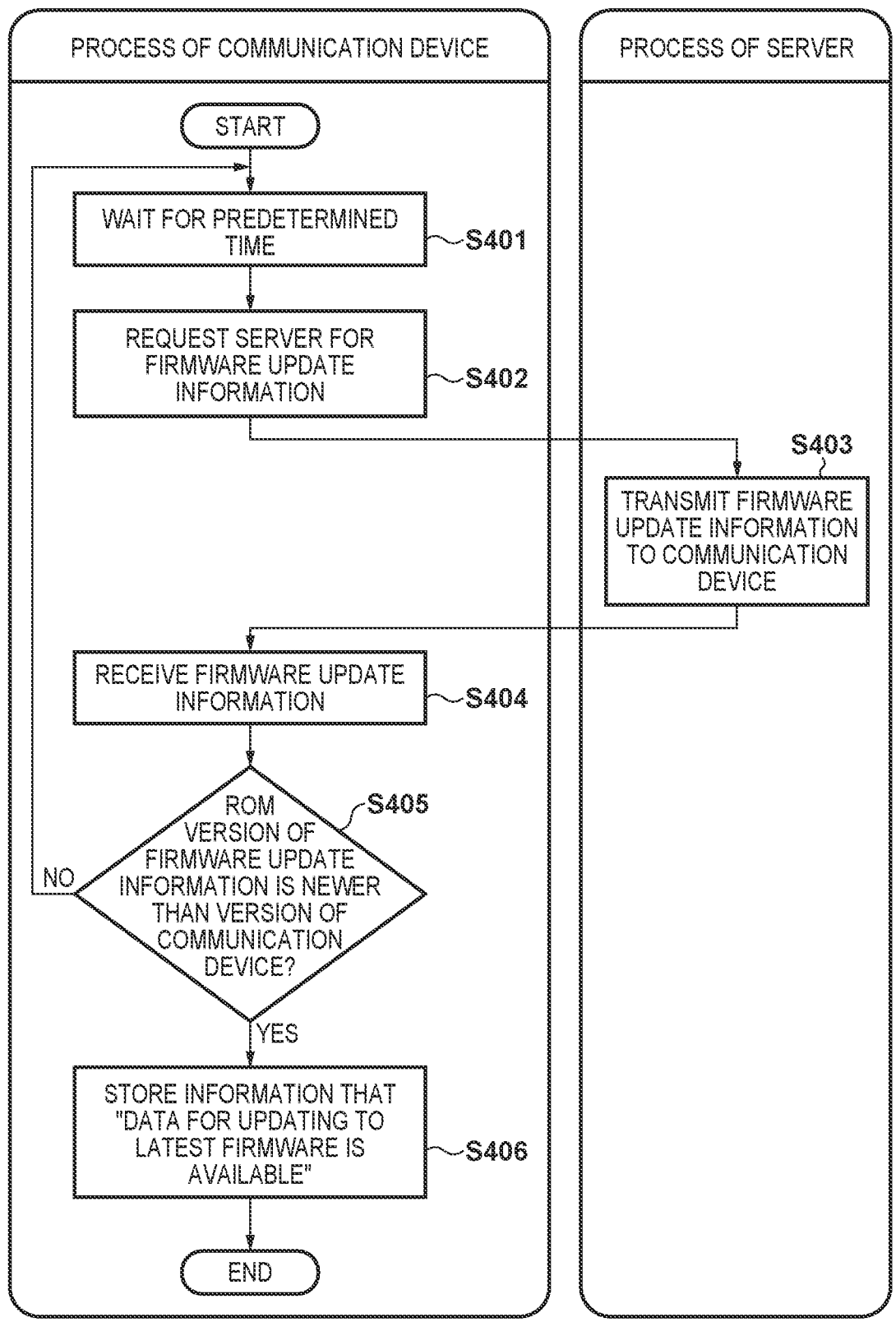
FIG. 4 is a flowchart illustrating a process of acquiring firmware update information.

FIG. 4 is a flowchart illustrating a process in which the communication device 102 acquires the firmware update information 500 and shifts the state in the communication device 102 to a "state in which data for updating to the latest firmware is available". Incidentally, shifting the state in the communication device 102 to the "state in which data for updating to the latest firmware is available" means storing, in the communication device 102, the information that "data for updating to the latest firmware is available" "Data for updating to the latest firmware is available" means that data for updating to the latest firmware is present in the server 101. Although a firmware update will be described as an example, the present embodiment is not limited to firmware and can be applied to updates of various kinds of software such as application software and an OS (operating system).

When the communication device 102 is activated by a power-on operation or the like of the power button by the user, in step S401, the CPU 208 of the communication device 102 waits for a predetermined time. In step S402, the CPU 208 requests firmware update information from the server 101 via the communication unit 202. Here, the reason for waiting for a predetermined time is to not increase the load of communication with the server 101 by continuously accessing the server 101. The waiting time may be set by the user or time information may be held statically in the communication device 102. The CPU 208 may also measure the duration of the power-off state. In step S402, identification information such as a model name of the communication device 102 is transmitted to the server 101 together with a request for firmware update information.

FIG. 5 is a diagram illustrating an example of the firmware update information 500. The firmware update information 500 is represented in an XML (extensible Markup Language) format as illustrated in FIG. 5. The firmware update information 500 is not the data itself for updating to the latest firmware but information on update data. For example, as illustrated in FIG. 5, the firmware update information 500 includes a ROM version 501, a ROM data size 502, and a model name 503 corresponding to the update data. The ROM version 501 is information indicating the version of the ROM in the server 101. The ROM data size 502 is information indicating the data size of the ROM in the server 101. The model name 503 is information indicating the model name of the ROM in the server 101.

In step S403, when the CPU 301 of the server 101 receives the request for the firmware update information, it transmits the firmware update information 500 corresponding to the communication device 102 to the communication device 102. The CPU 301 may authenticate the communication device 102 prior to transmitting the firmware update information 500 to the communication device 102.

In step S404, the CPU 208 of the communication device 102 receives the firmware update information 500 transmitted from the server 101 in step S403. Here, it may be determined whether or not the received firmware update information 500 corresponds to the communication device 102. When the received firmware update information 500 is determined not to correspond to the communication device 102, the received firmware update information 500 is discarded, and the process of FIG. 4 is terminated. Further, the firmware update information 500 transmitted from the server 101 in step S403 may be encrypted. If the firmware update information 500 is encrypted, the communication device 102 decodes the firmware update information 500 when it is received in step S404.

In step S405, the CPU 208 compares the ROM version 501 recorded in the firmware update information 500 received in step S404 with the ROM version in the communication device 102. The process proceeds to step S406 when it is determined that the ROM version recorded in the firmware update information 500 is newer than the ROM version in the communication device 102. Meanwhile, when it is determined that it is not new than the ROM version in the communication device 102, the process is repeated from step S401.

In step S406, the CPU 208 stores the information that "data for updating to the latest firmware is available" in a non-volatile memory such as the ROM 205. After storing the information that "data for updating to the latest firmware is available" in the communication device 102 in step S406, the process of FIG. 4 may be terminated or may be repeated from step S401.

In the present embodiment, the communication device 102 requests the server 101 for the firmware update information 500 and stores information on whether or not the data for updating to the latest firmware is present in the server 101 based on the acquired firmware update information 500. When it is determined in step S405 that the ROM version recorded in the firmware update information 500 is not newer than the ROM version in the communication device 102, the request in step S402 is repeated every predetermined time. In this embodiment, with such a configuration, the communication device 102 can recognize that data for updating to the latest firmware is present in the server 101 in accordance with a timing at which the data for updating to the latest firmware is prepared in the server 101.

In the present embodiment, if the state is the "state in which data for updating to the latest firmware is available" and the firmware can be updated when the communication device 102 detects a power-off operation by the user, a firmware update screen is displayed. The following describes a process for when a soft-off is executed by a user power-off operation. Incidentally, a soft-off indicates that power is turned off by a user operation (power-off instruction) on the power button of the communication device 102 or by an automatic power-off function of an energy saving function of the communication device 102. However, even in a soft-off state, the communication device 102 is connected to a commercial power supply by its power cord (power cable), and power is supplied to at least some of the components (e.g., the communication unit 202) of the communication device 102. That is, the soft-off state is a state that saves more power than the normal startup state (a soft-on state in which power is supplied to each component of the communication device 102) in which printing processing is possible and is different from the hard-off state (a state in which the communication device 102 is not connected to the commercial power supply and power is not supplied to each component of the communication device 102).

Figure 6:
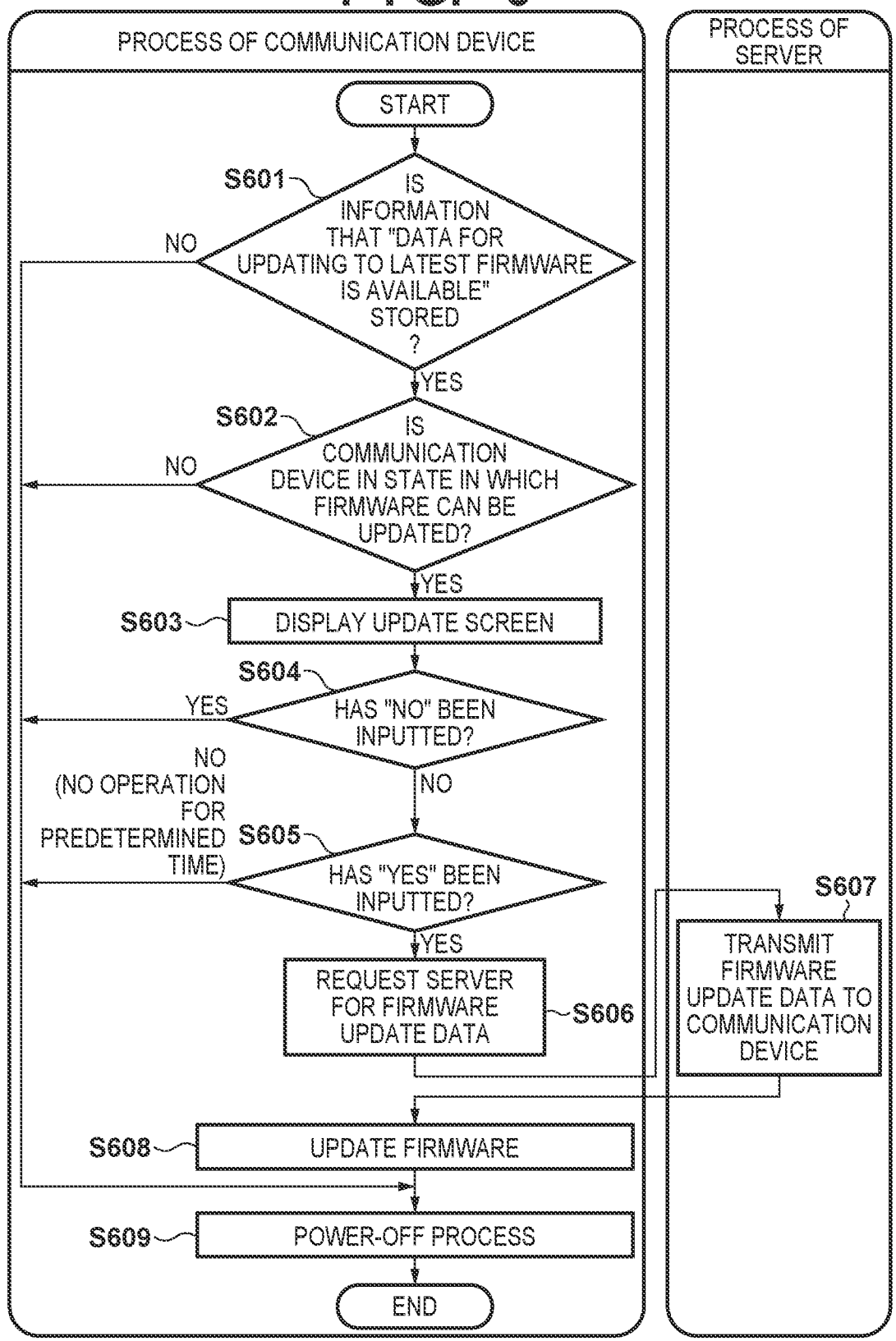
FIG. 6 is a flowchart illustrating a process for when a power-off operation is detected.

FIG. 6 is a flowchart illustrating a process for when a soil-off is executed by a user operation. When the CPU 208 of the communication device 102 detects a power-off operation by the user (a user instruction for a soft-off, such as the user pressing a power button), in step S601, the CPU 208 refers to the information stored in the non-volatile memory and determines whether or not the communication device 102 is in the "state in which data for updating to the latest firmware is available". If it is determined that the communication device 102 is in the "state in which data for updating to the latest firmware is available", the process proceeds to step S602, and if it is determined that the communication device 102 is not in the "state in which data for updating to the latest firmware is available", the process proceeds to step S609. In step S609, the CPU 208 executes a power-off process, and then terminates the process of FIG. 6.

In step S602, the CPU 208 determines whether or not the communication device 102 is in a state in which firmware can be updated. Here, in order to determine that the state is that in which the firmware can be updated, one condition, which is that the communication device 102 is in a state in which update data can be received from the server 101, is set. A state in which the communication device 102 can receive the update data from the server 101 is, for example, a state in which free space in the RAM, 206 of the communication device 102 is equal to or larger than a threshold. In a state in which the amount of free space in the RAM 206 is less than the threshold, it is not possible to complete reception of the update data. Therefore, for example, the state in which free space is equal to or greater than the threshold is set as the state in which the update data can be received. Further, whether or not the state is that in which the update data can be received may be determined based on the information, such as the above-described free space in the RAM 206, that the CPU 208 can continuously collect from when it detects a power-on.

In order to determine that the state is that in which the firmware can be updated, one condition, which is that data that must not be erased is not stored in the volatile memory, is set. This is because, if the communication device 102 is configured to perform a restart, when updating firmware, there is a possibility that the content stored in the RAM 206 may be erased when updating firmware. In the present embodiment, it is determined whether or not the communication device 102 is in a state in which firmware can be updated based on the above two conditions. The determination in step S602 is not limited to the above two conditions and may be performed based on other conditions. For example, the state of connection of other devices to the communication device 102 or a job execution status may be a condition. If it is determined in step S602 that the communication device 102 is in a state in which firmware can be updated, the process proceeds to step S603. On the other hand, if it is determined that the communication device 102 is not in a state in which firmware can be updated, the process proceeds to step S609, and the power-off process is executed.

In step S603, the CPU 208 displays a firmware update screen on the display unit 210. FIG. 7 is a diagram illustrating an example of a firmware update screen. As illustrated in FIG. 7, a message indicating that the data for updating to the latest firmware is present and buttons (items) that can accept an instruction as to whether or not to update firmware are displayed on the firmware update screen. Here, the CPU 208 starts a monitoring timer together with the display of the firmware update screen and monitors an elapse of a predetermined time.

In step S604, the CPU 208 determines whether or not an instruction to not update the firmware (for example, "no" button in FIG. 7) has been received on the firmware update screen. If an instruction to not update the firmware has been received, the process proceeds to step S609 and the power-off process is executed. If the instruction to not update the firmware has not been received, the process proceeds to step S605.

In step S605, the CPU 208 determines whether or not an instruction to update the firmware (for example, "yes" button in FIG. 7) has been received on the firmware update screen. If the instruction to update the firmware has been received, the process proceeds to step S606. In step S606, the CPU 208 requests the server 101 for data for updating to the latest firmware. In step S606, identification information such as a model name of the communication device 102 is transmitted to the server 101 together with a request for update data.

In step S607, the CPU 301 of the server 101 transmits update data that corresponds to the communication device 102 to the communication device 102. The CPU 301 may authenticate the communication device 102 prior to transmitting the update data to the communication device 102. The CPU 301 may encrypt the update data prior to transmitting the update data to the communication device 102. In such a case, the CPU 208 of the communication device 102 decodes the received updated data.

In step S608, the CPU 208 of the communication device 102 receives (downloads) the update data transmitted from the server 101 in step S607 and starts updating firmware. In step S608, it may be determined whether or not the received update data corresponds to the communication device 102. If the received update data is determined not correspond to the communication device 102, the received update data is discarded, and the process of FIG. 6 is terminated. After executing the firmware update, the CPU 208 stores, in the non-volatile memory, information indicating that the firmware update has been executed and the execution result (e.g., successful/unsuccessful) thereof. Thereafter, the process proceeds to step S609, and the power-off process is executed.

Thus, in the present embodiment, after detecting the power-off operation of the user, the firmware update screen is displayed if predetermined conditions are satisfied. Here, the predetermined conditions are that the data for updating the latest firmware is in the server and that the communication device 102 is in a state in which firmware can be updated. When an instruction to update the firmware is received from the user, the firmware is updated, and then the power-off is executed. With such a configuration, when the power-off operation is detected, if the communication device 102 satisfies the predetermined condition, it is possible to provide the user with an opportunity to be able to update the firmware. Detecting the power-off operation can be said to mean that it is highly likely for the user not to use the communication device 102 for some time from that point, and so the impact of updating the firmware on the user is very little. Accordingly, in the present embodiment, it is possible to provide the user with an opportunity to be able to update firmware at a more appropriate timing.

When an instruction to update the firmware is not received in step S605 and after an elapse of the predetermined time has been measured by the monitoring timer (i.e., time-out), the process proceeds to step S609, and the power-off process is executed. A case where a time-out occurs in step S605 and the process proceeds to step S609 is, for example, a case where the user did not recognize (did not notice) the firmware update screen despite it being displayed in step S603. In the present embodiment, when the predetermined time has elapsed after the display of the firmware update screen, the power-off is executed according to the power-off operation by the user. Further, even when the power-off operation is detected, displaying the firmware update screen for the predetermined time can make it easier for the user to recognize the firmware update screen. Further, it may be enabled to set the predetermined time in advance. Such a configuration can make it easier for the user to recognize the firmware update screen.

As described above, according to the present embodiment, it is possible to provide the user with an opportunity to be able to update firmware at a more appropriate timing. When the predetermined time elapses after the display of the firmware update screen, the power-off process is executed without updating firmware, assuming that the user could not recognize the firmware update screen. With such a configuration, it is possible to prevent a situation where the power-off process is not performed.

Second Embodiment

Hereinafter, a second embodiment will be described with reference to points different from the first embodiment. In the present embodiment, when an operation is not performed for the predetermined time on the firmware update screen, the communication device 102 stores, in the non-volatile memory, information indicating that the communication device 102 is in the "state in which data for updating to the latest firmware is available" and that the user has not recognized the firmware update screen. Then, when starting the next communication device 102, it is determined whether the above information is stored in the non-volatile memory, and when it is determined that the above information is stored, the firmware update screen is displayed. This can provide more opportunities for the user to be able to update the firmware.

Figure 8:
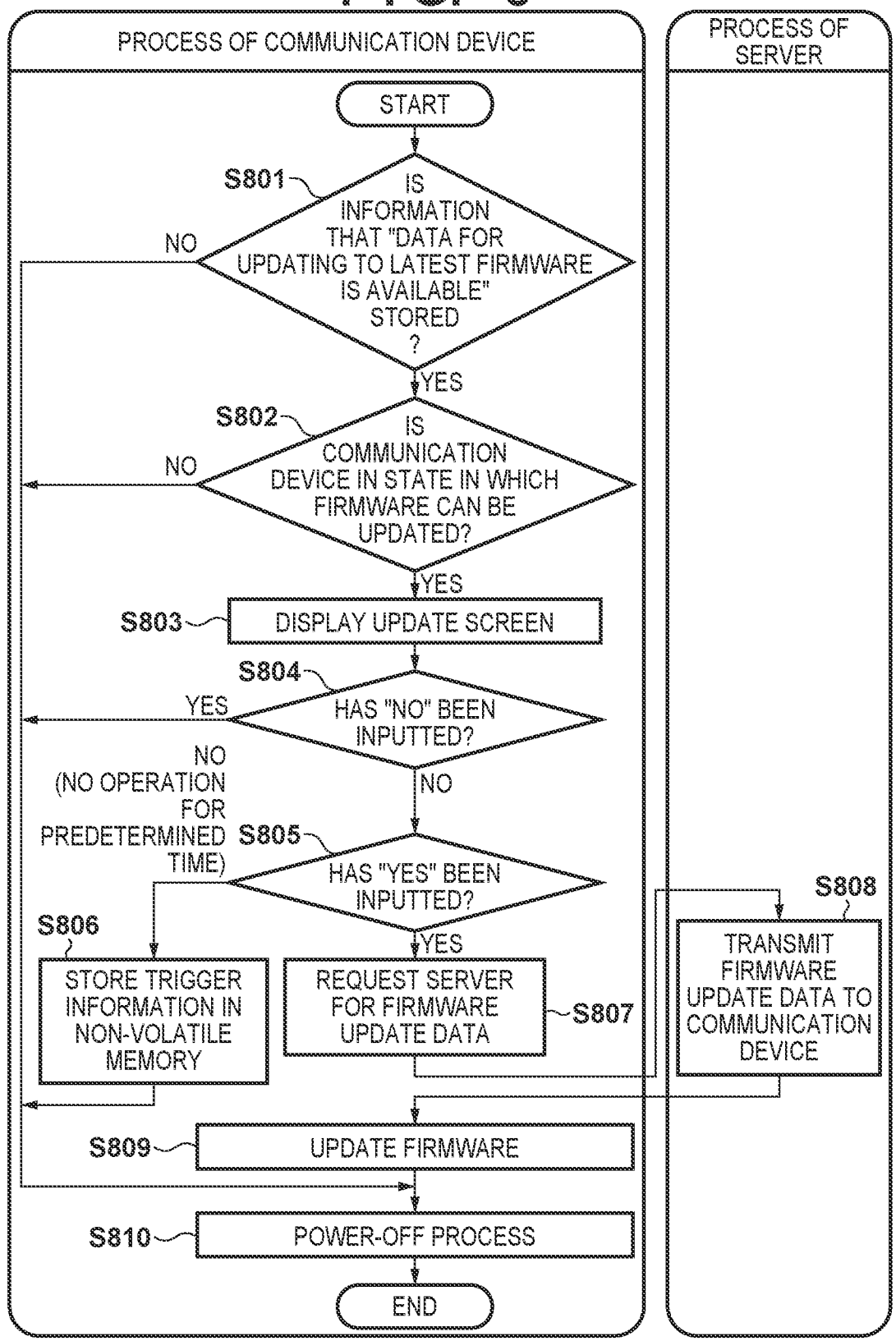
FIG. 8 is a flowchart illustrating a process for when a power-off operation is detected.

FIG. 8 is a flowchart illustrating a process for when a soft-off is executed by a user operation in the present embodiment. The descriptions of steps S801 to S805 and S807 to S810 are the same as that of steps S601 to S605 and S606 to S609 of FIG. 6, and so their descriptions will be omitted.

When the monitoring timer started in step S803 times out in step S805, the process proceeds to step S806. In step S806, the CPU 208 of the communication device 102 stores, in the non-volatile memory, information indicating that the communication device 102 is in the "state in which data for updating to the latest firmware is available" and that the user has not recognized the firmware update screen. Thereafter, in step S810, the power-off process is executed.

The information indicating that the state is the "state in which data for updating to the latest firmware is available" and that the user has not recognized the firmware update screen is, in other words, trigger information that triggers the display of the firmware update screen at the next startup of the communication device 102. That is, the above trigger information is stored in the non-volatile memory, and the CPU 208 is configured to refer to the non-volatile memory at the next startup (for example, a power-on operation by a user). This allows the firmware update screen to be displayed based on the fact that the trigger information is stored. Hereinafter, the above trigger information is set as first trigger information.

Figure 9:
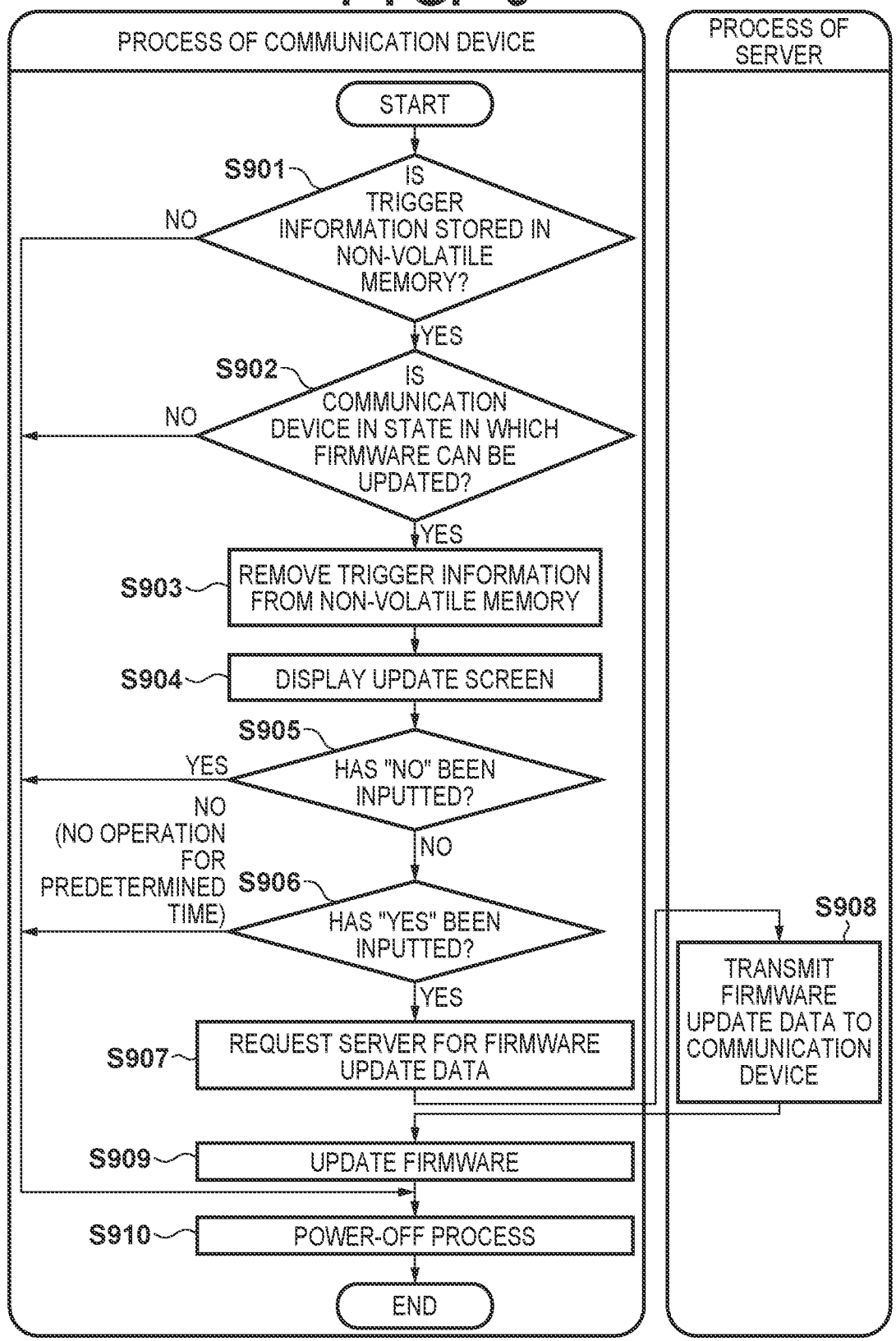
FIG. 9 is a flowchart illustrating a process for when a power-on operation is detected.

FIG. 9 is a flowchart illustrating a process for when a power-on is executed by a user operation. Here, the case where a power-on is executed by a user operation will be described, but the case may be such that the power-on operation is performed without the intervention of a user operation.

The CPU 208 of the communication device 102, when detecting the power-on operation by the user, executes the process of step S901, in step S901, the CPU 208 of the communication device 102 determines whether or not the first trigger information indicating that the communication device 102 is in the "state in which data for updating to the latest firmware is available" and that the user has not recognized the firmware update screen is stored in the non-volatile memory. Here, if the first trigger information is determined to be stored, the process proceeds to step S902. Meanwhile, if the first trigger information is determined not to be stored, the process proceeds to step S910. In step S910, the CPU 208 executes a power-on process, and then terminates the process of FIG. 9.

Similarly to step S602 of FIG. 6, in step S902, the CPU 208 determines whether or not the communication device 102 is in a state in which firmware can be updated. If it is determined that the communication device 102 is in a state in which firmware can be updated, the process proceeds to step S903. On the other hand, if it is determined that the communication device 102 is not in a state in which firmware can be updated, the process proceeds to step S910, and the power-on process is executed.

In step S903, the CPU 208 removes the first trigger information from the non-volatile memory and, in step S904, displays the firmware update screen illustrated in FIG. 7 on the display unit 210. The CPU 208 starts a monitoring timer together with the display of the firmware update screen and monitors an elapse of a predetermined time.

In step S905, the CPU 208 determines whether or not an instruction to not update the firmware (for example, "no" button in FIG. 7) has been received on the firmware update screen. If an instruction to not update the firmware has been received, the process proceeds to step S910 and the power-on process is executed. If the instruction to not update the firmware has not been received, the process proceeds to step S906.

In step S906, the CPU 208 determines whether or not an instruction to update the firmware (for example, "yes" button in FIG. 7) has been received on the firmware update screen. If the instruction to update the firmware has been received, the process proceeds to step S907. Meanwhile, if an instruction to update the firmware is not received and an elapse of the predetermined time has been measured by the monitoring timer (i.e., time-out), the process proceeds to step S910, and the power-on process is executed. A case where time-out occurs in step S906 and the process proceeds to step S910 is, for example, a case where the user did not recognize the firmware update screen despite it being displayed in step S904.

As described above, in the present embodiment, when the user has not recognized the firmware update screen displayed when the power-off operation is detected, the firmware update screen can be displayed at the next startup of the communication device 102.

When an instruction to update the firmware is received in step S906, in step S907, the CPU 208 requests the server 101 for data for updating to the latest firmware. In step S907, identification information such as a model name of the communication device 102 is transmitted to the server 101 together with the request for update data. In addition, a request for the firmware update information 500 may be transmitted together with the request for the update data.

In step S908, the CPU 301 of the server 101 transmits the update data corresponding to the communication device 102 to the communication device 102. The CPU 301 may authenticate the communication device 102 prior to transmitting the update data to the communication device 102. The CPU 301 may encrypt the update data prior to transmitting the update data to the communication device 102, In such a case, the CPU 208 of the communication device 102 decodes the received updated data.

In step S909, the CPU 208 of the communication device 102 receives the update data transmitted from the server 101 in step S908 and starts updating the firmware. In step S909, it may be determined whether or not the received update data corresponds to the communication device 102. If the received update data is determined not correspond to the communication device 102, the received update data is discarded, and the process of FIG. 9 is terminated. After executing the firmware update, the CPU 208 stores, in the non-volatile memory, information indicating that the firmware update has been executed and the execution result (e.g., successful/unsuccessful) thereof. Thereafter, the process proceeds to step S910, and the power-on process is executed.

Figure 10:
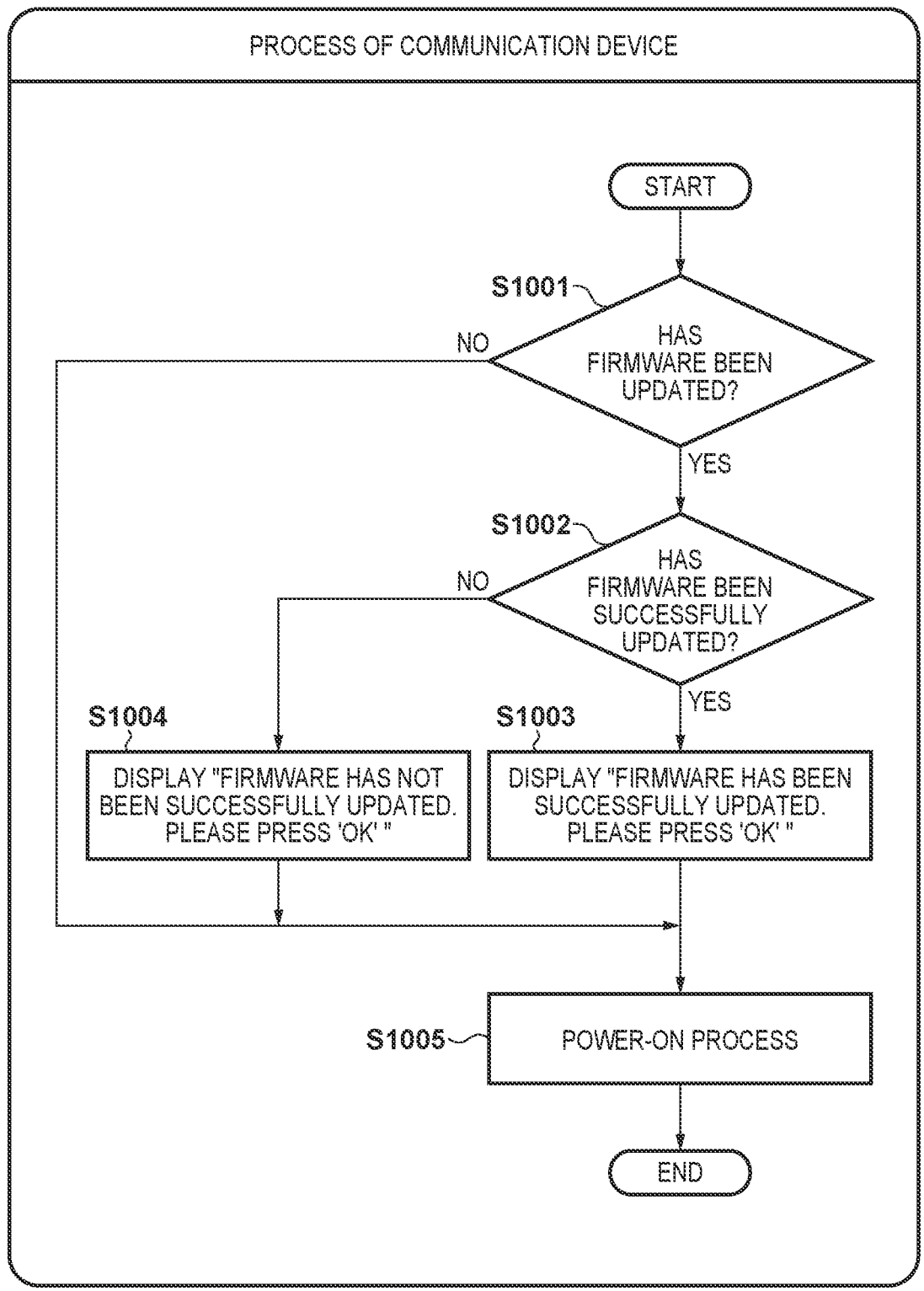
FIG. 10 is a flowchart illustrating a process for when a power-on operation is detected.

FIG. 10 is a flowchart illustrating a process of displaying the firmware update result after a restart after updating the firmware in step S909. In step S1001, the CPU 208 of the communication device 102 determines whether or not the updating of the firmware has been performed. The determination in step S1001, for example, may be performed based on whether the above-described information has been stored in the non-volatile memory in step S909. If it is determined that the firmware update has been executed, the process proceeds to step S1002, On the other hand, if it is determined that the firmware has not been updated, the process proceeds to step S1005, and the CPU 208 executes the power-on process, and then terminates the process of FIG. 10.

In step S1002, the CPU 208 determines whether the firmware update has been successful or unsuccessful based on the information stored in the non-volatile memory in step S909. If it is determined to have been successful, the process proceeds to step S1003, and if it is determined to have been unsuccessful, the process proceeds to step S1004.

In step S1003, the CPU 208 displays a screen on the display unit 210 notifying that the firmware has been successfully updated. FIG. 11 is a diagram illustrating an example of a screen displayed in step S1003. On the screen of FIG. 11, a message that the firm mare has been successfully updated and prompting confirmation is displayed. A message prompting confirmation is, for example, a message prompting a press of an OK button. When the user presses the OK button (not illustrated), the process proceeds from step S1003 to S1005, and the power-on process is executed.

In step S1004, the CPU 208 displays a screen on the display unit 210 notifying that the firmware has not been successfully updated. FIG. 12 is a diagram illustrating an example of a screen displayed in step S1004. On the screen of FIG. 12, a message that the firmware has not been successfully updated and prompting confirmation is displayed. A message prompting confirmation is, for example, a message prompting a press of the OK button. When the user presses the OK button (not illustrated), the process proceeds from step S1004 to S1005, and the power-on process is executed. After step S1005, the process of FIG. 10 is terminated.

As described above, according to the present embodiment, when the predetermined time has elapsed after the display of the firmware update screen, the trigger information (first trigger information) for displaying the firmware update screen at the next startup of the communication device 102 is stored in the non-volatile memory. When the next power-on operation is detected, the firmware update screen is displayed based on the fact that the above trigger information is stored in the non-volatile memory. Such a configuration can provide more opportunities for the user to be able to update the firmware.

Third Embodiment

Hereinafter, a third embodiment will be described with reference to points different from the first and second embodiments. In the second embodiment, it has been described that when a time-out occurs after the power-off operation is detected and the firmware update screen is displayed, the first trigger information is stored in the non-volatile memory, and the firmware, update screen is displayed at the next startup of the communication device 102. In the present embodiment, after the power-off operation is detected and the firmware update screen is displayed, if the supply of power is cut or the power-off operation of the user is detected again during the display, the firmware update screen can be displayed at the next startup of the communication device 102.

Figure 13:
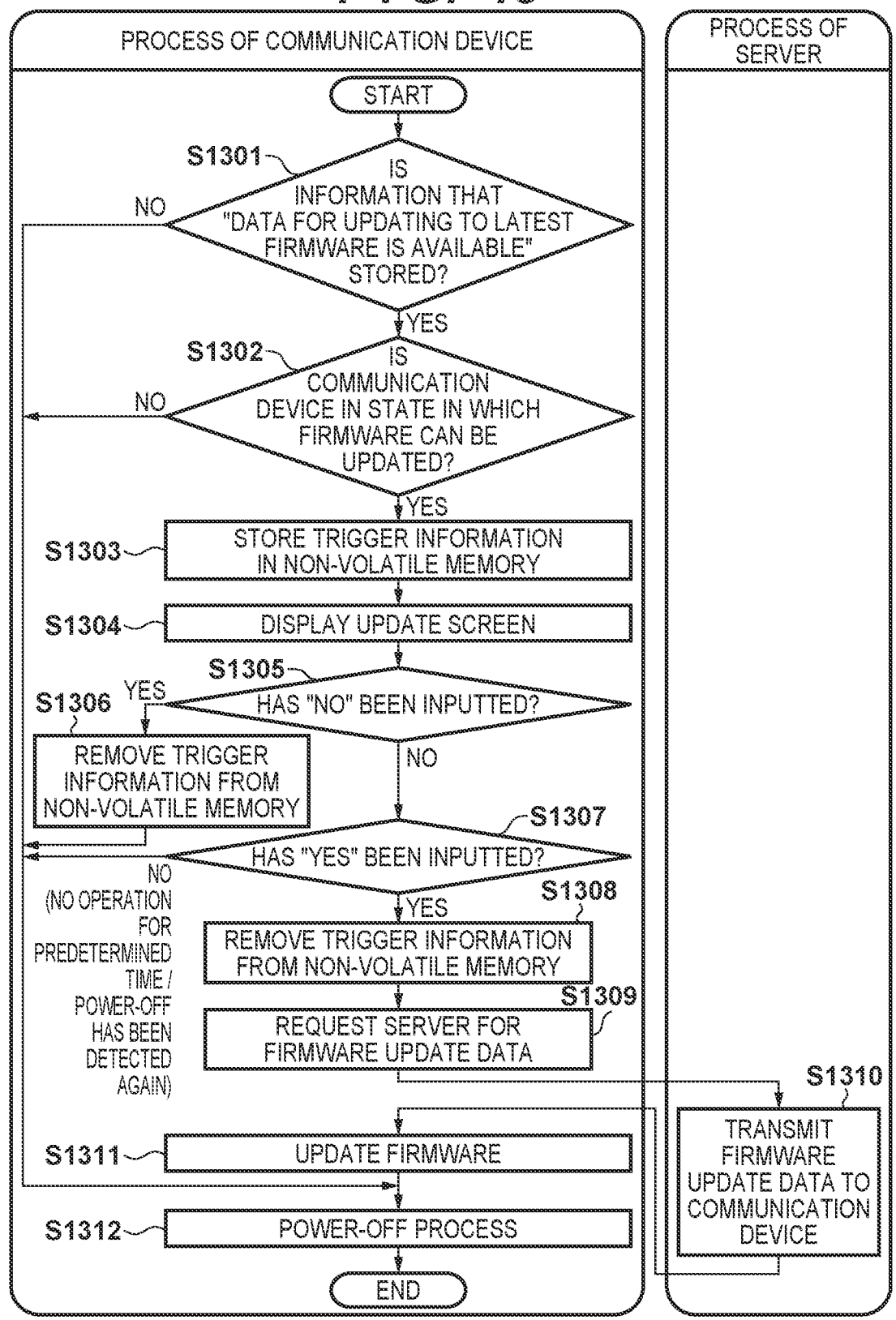
FIG. 13 is a flowchart illustrating a process for when a power-off operation is detected.

FIG. 13 is a flowchart illustrating a process for when a soft-off is executed by a user operation in the present embodiment. The descriptions of steps S1301 and S1302 are the same as that of steps S601 and S602 of FIG. 6, and so their descriptions will be omitted. If it is determined in step S1302 that the communication device 102 is in a state in which firmware can be updated, the process proceeds to step S1303.

In step S1303, the CPU 208 of the communication device 102 temporarily stores, in the non-volatile memory, the first trigger information indicating that the communication device 102 is in the "state in which data for updating to the latest firmware is available" and that the user has not recognized the firmware update screen and then proceeds to step 1304.

In step S1304, the CPU 208 displays the firmware update screen illustrated in FIG. 7 on the display unit 210 in the same manner as in step S603 of FIG. 6. At this time, the CPU 208 starts the monitoring tinier to monitor the elapse of the predetermined time.

That is, in the present embodiment, the first trigger information is temporarily stored in the non-volatile memory before the display of the firmware update screen. With such a configuration, although the process of FIG. 13 is terminated when the power supply is cut off in step S1304, for example, the state can be such that the first trigger information is stored in the non-volatile memory. That is, at the next startup of communication device 102, since the state is that in which the first trigger information is stored in the non-volatile memory, it is possible to display the firmware update screen.

In step S1305, the CPU 208 determines whether or not an instruction to not update the firmware (for example, "no" button in FIG. 7) has been received on the firmware update screen. If the instruction to not update the firmware has been received, the process proceeds to step S1306. In step S1306, the CPU 208 removes, from the non-volatile memory, the first trigger information temporarily stored in step S1303. In step S1312, the CPU 208 executes the power-off process, and then terminates the process of FIG. 13.

Thus, in the present embodiment, when an instruction to not update the firmware is received from the user, the power-off process is executed without updating the firmware, and control is performed so as not to display the firmware update screen at the next startup of the communication device 102. As a result, it is possible to prevent providing too many opportunities to be able to update the firmware.

Meanwhile, when an instruction to not update the firmware has not been received, in step S1307, the CPU 208 determines whether or not an instruction to update the firmware (fix example, the "yes" button in FIG. 7) has been received on the firmware update screen. If the instruction to update the firmware has been received, the process proceeds to step S1308. In step S1308, the CPU 208 removes, from the non-volatile memory, the first trigger information temporarily stored in step S1303. Then, similarly to steps S606 to S608 of FIG. 6, steps S1309 to S1311 are executed to update the firmware. Thereafter, in step S1312, the power-off process is executed.

As described above, in the present embodiment, when an instruction to update the firmware is received from the user, the first trigger information temporarily stored in the non-volatile memory is deleted, and control is performed so as not to display the firmware update screen at the next startup of the communication device 102.

When an instruction to update the firmware is not received in step S1307 and an elapse of the predetermined time has been measured by the monitoring timer (i.e., time-out), the process proceeds to step S1312, and the power-off process is executed. A case where time-out occurs in step S1307 and the process proceeds to step S1312 is, for example, a case where the user did not recognize the firmware update screen despite it being displayed in step S1304. In this case, in order to display the firmware update screen at the next startup of the communication device 102, the state in which the first trigger information is left stored in the non-volatile memory is set. After that, the CPU 208, when detecting the power-on operation by the user, executes the process of FIG. 9. Then, the process proceeds from step S901 to S902, and when it is determined in step S902 that the communication device 102 is in the state in which firmware can be updated, the processes of steps S903 and S904 are executed, and the firmware update screen is displayed.

Further, after the firmware update screen is displayed in step S1304, when the power-off operation by the user is detected again, the process proceeds from step S1307 to S1312 without deleting the first trigger information stored in the non-volatile memory, and the power-off process is executed.

As described above, in the present embodiment, the first trigger information is temporarily stored in the non-volatile memory before the display of the firmware update screen. When the user receives an instruction to update or not update the firmware, the first trigger information in the non-volatile memory is deleted. Otherwise, the power-off process is executed in a state in which the first trigger information is stored in the non-volatile memory. With such a configuration, it is possible to provide the user with an opportunity to be able to update the firmware after the startup of the communication device 102 even when the power-off operation is detected again while the firmware update screen is being displayed or when the power supply is cut while the firmware update screen is being displayed.

Fourth Embodiment

Hereinafter, a fourth embodiment will be described with reference to points different from the first to third embodiments. In the present embodiment, when receiving an instruction to not update the firmware after the display of the firmware update screen, a screen that can receive an instruction whether or not to execute the firmware update at the next startup of the communication device 102 is displayed. Such a configuration can provide more opportunities for the user to be able to update the firmware.

Figure 14:
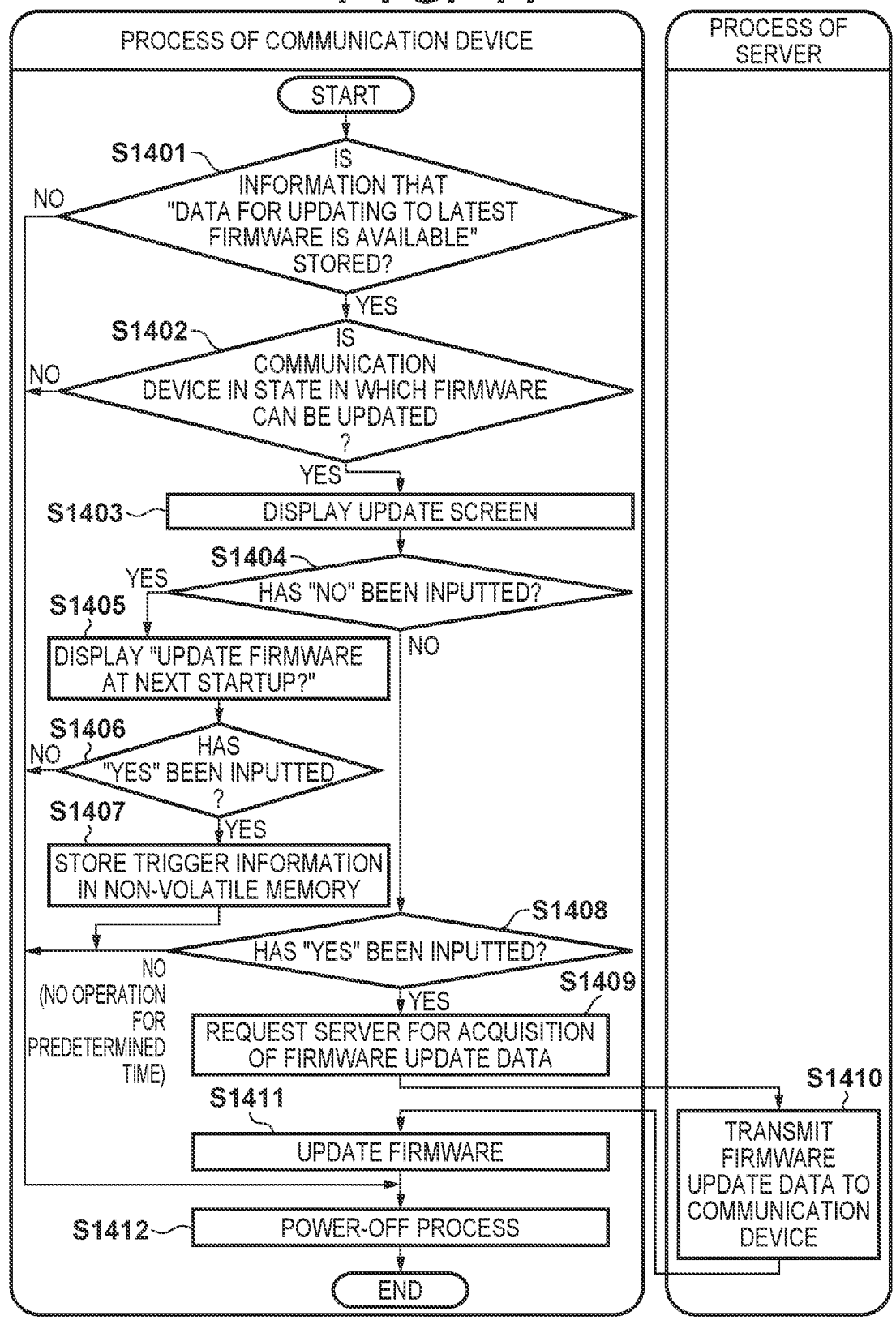
FIG. 14 is a flowchart illustrating a process for when a power-off operation is detected.

FIG. 14 is a flowchart illustrating a process for when a soft-off is executed by a user operation in the present embodiment. The descriptions of steps S1401 to S1404 are the same as that of steps S601 to S604 of FIG. 6, and so their descriptions will be omitted.

When an instruction to update the firmware is received, the process advances from step S1404 to steps S1408 and S1409. The descriptions of steps S1408 to S1412 are the same as that of steps S605 to S609 of FIG. 6, and so their descriptions will be omitted. Meanwhile, if the instruction to not update the firmware has been received in step S1404, the process proceeds to step S1405.

Figure 16:
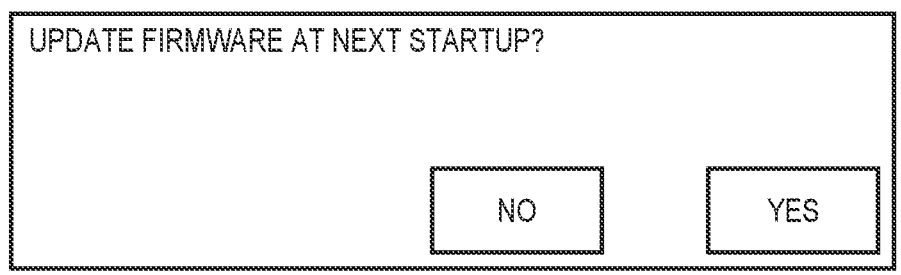
FIG. 16 is a diagram illustrating a user interface screen.

In step S1405, the CPU 208 of the communication device 102 displays, on the display unit 210, a confirmation screen for prompting the user to confirm whether to update the firmware at the next startup of the communication device 102. FIG. 16 is a diagram illustrating an example of a confirmation screen displayed in step S1405. As illustrated in FIG. 16, on the confirmation screen, a message for confirming whether or not to update the firmware at the next startup of the communication device 102 and a button for accepting an instruction on whether or not to update the firmware is displayed.

In step S1406, the CPU 208 determines whether or not it has received an instruction for updating the firmware. When it is determined that an instruction for displaying the confirmation screen (for example, the "yes" button in FIG. 16) has been received, in step S1407, the CPU 208 stores, in the non-volatile memory, information indicating that the firmware is to be updated at the next startup of the communication device 102. Thereafter, the process proceeds to step S1412, and the power-off process is executed. Meanwhile, if it is determined in step S1406 that an instruction not to display the confirmation screen has been received, the process proceeds to step S1412, and the power-off process is executed.

As described above, in the present embodiment, when the firmware update screen is displayed and an instruction to not update the firmware has been received, a confirmation screen for confirming whether or not to update the firmware at the next startup of the communication device 102 is displayed. When an instruction to update has been received on the confirmation screen, information to that effect is stored in the non-volatile memory. This information, in other words, is trigger information for updating the firmware at the next startup of the communication device 102 (referred to as second trigger information). By configuring to store the above second trigger information in the non-volatile memory and for the CPU 208 to refer to the non-volatile memory at the next startup (for example, a power-on operation by a user), it becomes possible to update the firmware on the basis that the second trigger information is stored.

Figure 15:
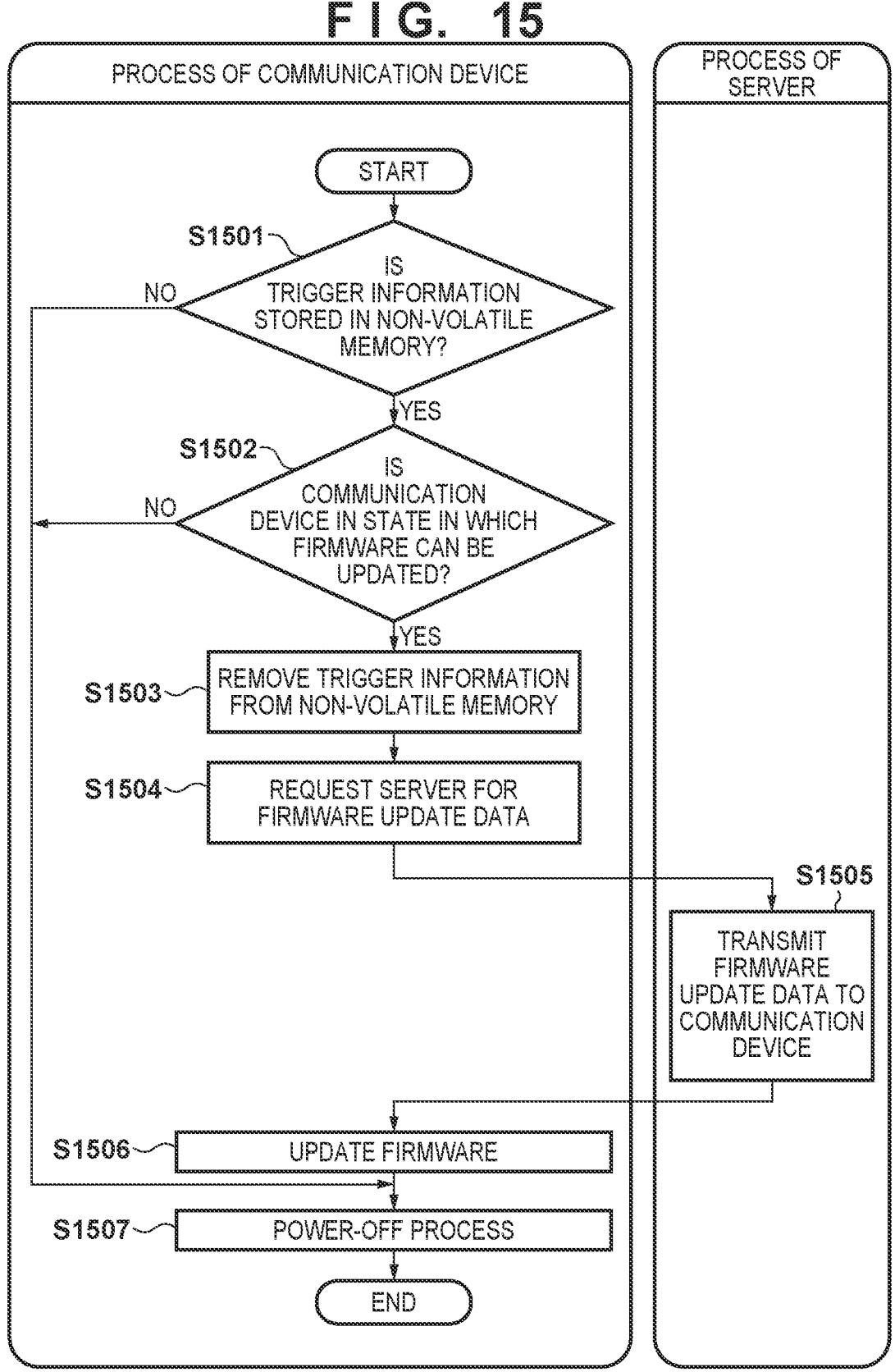
FIG. 15 is a flowchart illustrating a process for when a power-on operation is detected.

FIG. 15 is a flowchart illustrating a process for when a power-on is executed by a user operation in the present embodiment. Here, the case where a power-on is executed by a user operation will be described, but the case may be such that the power-on operation is performed without the intervention of a user operation.

When the CPU 208 of the communication device 102 detects the power-on operation by the user, in step S1501, the CPU 208 determines whether or not the second trigger information described in step S1407 is stored in the non-volatile memory. If it is determined that the second trigger information is not stored in the non-volatile memory, the process proceeds to step S1507, and the CPU 208 executes the power-on process, and then terminates the process of FIG. 15. Meanwhile, if the second trigger information is determined to be stored in the non-volatile memory, the process proceeds to step S1502.

Similarly to step S602 of FIG. 6, in step S1502, the CPU 208 determines whether or not the communication device 102 is in a state in which firmware can be updated. If it is determined that the communication device 102 is not in a state in which firmware can be updated, the process proceeds to step S1507, and the power-on process is executed. Meanwhile, if it is determined that the communication device 102 is in a state in which firmware can be updated, the process proceeds to step S1503.

In step S1503, the CPU 208 removes, from the non-volatile memory, the second trigger information stored in the non-volatile memory in step S1407. In step S1504, the CPU 208 requests the server 101 for data for updating to the latest firmware. In step S1504, identification information such as a model name of the communication device 102 is transmitted to the server 101 together with the request for update data. In addition, a request for the firmware update information 500 may be transmitted together with the request for the update data.

In step S1505, the CPU 301 of the server 101 transmits the update data that corresponds to the communication device 102 to the communication device 102. The CPU 301 may authenticate the communication device 102 prior to transmitting the update data to the communication device 102. The CPU 301 may encrypt the update data prior to transmitting the update data to the communication device 102. In such a case, the CPU 208 of the communication device 102 decodes the received updated data.

In step S1506, the CPU 208 of the communication device 102 receives the update data transmitted from the server 101 in step S1505 and starts updating the firmware. In step S1506, it may be determined whether or not the received update data corresponds to the communication device 102. If the received update data is determined not to correspond to the communication device 102, the received update data is discarded, and the power-on process is executed. After executing the firmware update, the CPU 208 stores, in the non-volatile memory, information indicating that the firmware update has been executed and the execution result e.g., successful/unsuccessful) thereof. Thereafter, the process proceeds to step S1507, and the power-on process is executed. Note that, in step S1506, the process of FIG. 10 is executed similarly to the second embodiment.

As described above, in the present embodiment, when an instruction to not update the firmware has been received on the firmware update screen, a reception screen that can receive an instruction on whether or not to update the firmware at the next startup of the communication device 102 is displayed. When the instruction for updating the firmware is received, the firmware is updated at the next startup of the communication device 102. Such a configuration can provide more opportunities for the user to be able to execute a firmware update.

Fifth Embodiment

Hereinafter, a fifth embodiment will be described with reference to points different from the first to fourth embodiments. In the present embodiment, when the power-on operation by the user is detected after updating the firmware and then executing the power-off process, the result of the previously-executed firmware update is displayed. If the firmware has not been successfully updated, the firmware update screen is displayed again. Such a configuration can provide more opportunities for the user to be able to update the firmware.

FIG. 17 is a flowchart illustrating a process for when a power-on is executed by a user operation in the present embodiment. Here, the case where a power-on is executed by a user operation will be described, but the case may be such that the power-on operation is performed without the intervention of a user operation.

The CPU 208 of the communication device 102, when detecting the power-on operation by the user, determines, in step S1701, whether or not updating of the firmware has been performed. The determination of step S1701 may be based on, for example, information stored in the non-volatile memory when the firmware update was executed in step S608. If it is determined that the firmware has not been updated, the process proceeds to step S1712, and the CPU 208 executes the power-on process, and then terminates the process of FIG. 17, Meanwhile, if it is determined that the firmware update has been executed, the process proceeds to step S1702.

In step S1702, the CPU 208 determines whether the result of executing the firmware update has been successful or unsuccessful. The determination of step S1702 may be based on, for example, information on the execution result stored in the non-volatile memory when the firmware update was executed in step S608. If it is determined that the result of executing the firmware update is successful, the process proceeds to step S1703, and the CPU 208 displays, on the display unit 210, the screen of FIG. 11 which notifies that the firmware has been successfully updated. Upon receiving a confirmation from the user on the screen, the process proceeds to step S1712, and the power-on process is executed. Meanwhile, if it is determined that the result of executing the firmware update is unsuccessful, the process proceeds to step S1704, and the CPU 208 displays, on the display unit 210, the screen of FIG. 12 which notifies that the firmware has not been successfully updated. Upon receiving a confirmation from the user on the screen, the process proceeds to step S1705.

In step S1705, the CPU 208 determines whether or not the communication device 102 is in a state in which firmware can be updated. If it is determined that the communication device 102 is in a state in which firmware can be updated, the process proceeds to step S1706. If it is determined that the communication device 102 is not in a state in which firmware can be updated, the process proceeds to step S1712, and the power-on process is executed.

In step S11706, the CPU 208 displays a firmware update screen of FIG. 7 on the display unit 210. The descriptions of subsequent steps S1707 to S1712 are the same as that of steps S905 to S910 of FIG. 9, and so their descriptions will be omitted.

As described above, according to the present embodiment, when the power-on operation of the communication device 102 is detected, the execution result of the previously-executed firmware update is displayed. At this time, if the result of executing the firmware update is unsuccessful, the firmware update screen is displayed and a firmware update is enabled. Such a configuration can provide more opportunities for the user to be able to update the firmware.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No, 2021-023692, filed Feb. 17, 2021, which is hereby incorporated by reference herein in its entirety,

What is claimed is:

1. A communication device comprising:
at least one memory storing instructions; and
at least one processor that executes the stored instructions to function as:
  a detection unit configured to detect a power supply operation of the communication device by a user;
  a power supply control unit configured to change a power supply state of the communication device in accordance with the power supply operation that the detection unit has detected;
  a display control unit configured to, in a case where the detection unit has detected the power supply operation, display, on a display unit, an update screen capable of receiving a user instruction for updating software on a basis that the communication device is in a state in which the software can be updated, before the power supply control unit changes the power supply state of the communication device in accordance with the power supply operation; and
  a first storage control unit,
wherein
  the display control unit, even in a state in which a user instruction has not been received with respect to the update screen, displays the update screen until a predetermined time has elapsed,
  the power supply control unit changes the power supply state of the communication device in accordance with the power supply operation after the predetermined time has elapsed,
  the first storage unit, in a case where the power supply operation is a power-off operation and the user instruction has not been received via the update screen at a time the predetermined time has elapsed, stores, in a non-volatile memory of the communication device, first trigger information for newly displaying the update screen so as to enter a state in which the first trigger information is stored in the non-volatile memory of the communication device, in a case where the detection unit detects a power-on operation as the power supply operation after the first storage unit stores the first trigger information in the non-volatile memory and the power supply control unit powers off the communication device, the display control unit, before the power supply control unit powers on the communication device, displays the update screen on the display unit on a basis that the first trigger information is stored in the non-volatile memory of the communication device, and
wherein, the state in which the software can be updated includes predetermined data, whose data type is different from a data type of the first trigger information, not being stored in the volatile memory of the communication device.

2. The communication device according to claim 1, wherein in a case where the power supply operation is the power-off operation, the power supply control unit powers off the communication device after the predetermined time has elapsed.

3. The communication device according to claim 2, wherein the power supply control unit changes to a state in which more power is saved than in a normal startup state, as a power-off of the communication device.

4. The communication device according to claim 1, wherein the at least one processor further executes the stored instructions to function as an execution unit configured to, in a case where an instruction to update the software is received via the update screen, execute an update of the software, wherein
the power supply control unit changes the power supply state of the communication device in accordance with the power supply operation after the execution of the update of the software by the execution unit.

5. The communication device according to claim 4, wherein the at least one processor further executes the stored instructions to function as a second storage unit configured to store, in a non-volatile memory of the communication device, an execution result of the execution unit, wherein
in a case where the detection unit detects a power-on operation as the power supply operation after the power supply control unit powers off the communication device, the display control unit displays, on the display unit, the execution result, before the power supply control unit powers on the communication device.

6. The communication device according to claim 5, wherein the display control unit, in a case where the execution result indicates a failure of the update of the software, displays the update screen after displaying the execution result.

7. The communication device according to claim 1, wherein in a case where an instruction not to update the software is received via the update screen, the display control unit displays, on the display unit, a reception screen for receiving an instruction on whether or not the communication device executes an update of the software at a startup after a power-off.

8. The communication device according to claim 7, further comprising:
a third storage unit configured to, in a case where an instruction to execute the update of the software is received via the reception screen, store, in the non-volatile memory of the communication device, second trigger information for executing the update of the software, wherein
in a case where the detection unit detects the power-on operation as the power supply operation after the power supply control unit powers off the communication device, the update of the software is executed on a basis that the second trigger information is stored in the non-volatile memory and the communication device is in a state in which the software can be updated.

9. The communication device according to claim 1, wherein the update of the software is executed by acquiring, from an external device, update data for updating the software.

10. The communication device according to claim 9, wherein the communication device being in the state in which the software can be updated includes the update data being present in the external device.

11. The communication device according to claim 10, wherein the at least one processor further executes the stored instructions to function as an acquisition unit configured to acquire information related to the update data from the external device; and
a determination unit configured to determine whether or not the communication device is the state in which the software can be updated based on the information related to the update data that the acquisition unit has acquired.

12. The communication device according to claim 11, wherein
the software is firmware, and
the information related to the update data includes at least one of a ROM (read only memory) version and a ROM data size of the firmware.

13. The communication device according to claim 10, wherein the communication device being in the state in which the software can be updated includes being able to receive the update data from the external device.

14. The communication device according to claim 1, wherein the communication device is a printer.

15. A control method executed in a communication device, the method comprising:
detecting a power supply operation of the communication device by a user;
changing a power supply state of the communication device in accordance with the power supply operation that has been detected; and
in a case where the power supply operation has been detected, displaying, on a display unit, an update screen capable of receiving a user instruction for updating software on a basis that the communication device is in a state in which the software can be updated before changing the power supply state of the communication device in accordance with the power supply operation, wherein even in a state in which a user instruction has not been received with respect to the update screen, the update screen is displayed until a predetermined time has elapsed, and the power supply state of the communication device is changed in accordance with the power supply operation after the predetermined time has elapsed, further comprising storing in a non-volatile memory of the communication device, in a case where the power supply operation is a power-off operation and the user instructions has not been received via the update screen at a time the predetermined time has elapsed, first trigger information for newly displaying the update screen so as to enter a state in which the first trigger information is stored in the non-volatile memory of the communication device, and in a case where a power-on operation has been detected as the power supply operation after the storing of the first trigger information in the non-volatile memory and the communication device has been powered off, before powering on the communication device, displaying the update screen on the display unit on a basis that the first trigger information is stored in the non-volatile memory of the communication device, wherein, the state in which the software can be updated includes predetermined data, whose data type is different from a data type of the first trigger information, not being stored in the volatile memory of the communication device.

* * * * *